Jan. 26, 1932. H. KATTWINKEL 1,842,406
APPARATUS FOR APPLYING FRICTIONAL COVERINGS TO THE
LAMINATIONS OF FRICTION CLUTCHES AND THE LIKE
Filed March 9, 1928
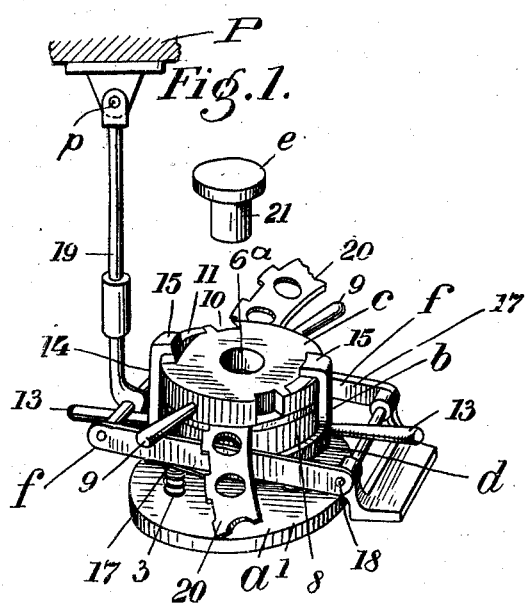
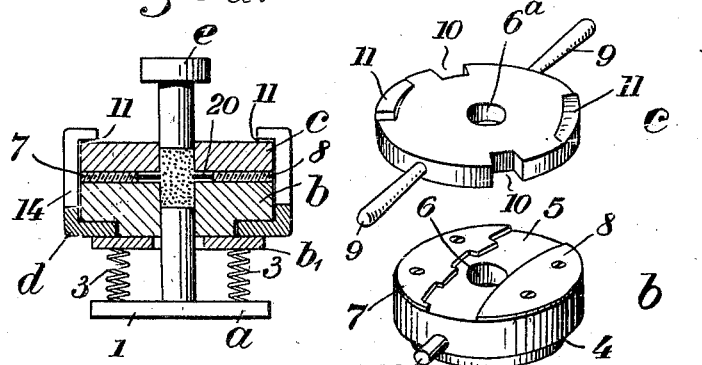
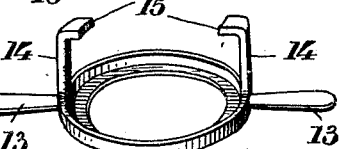
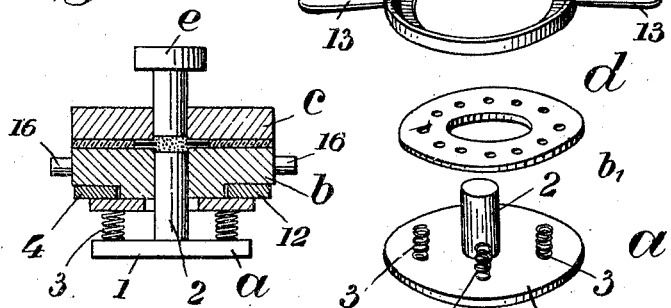
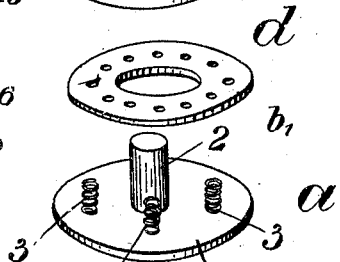

Patented Jan. 26, 1932

1,842,406

UNITED STATES PATENT OFFICE

HANS KATTWINKEL, OF COSWIG, GERMANY

APPARATUS FOR APPLYING FRICTIONAL COVERINGS TO THE LAMINATIONS OF FRICTION CLUTCHES AND THE LIKE

Application filed March 9, 1928, Serial No. 260,409, and in Germany January 31, 1927.

My invention relates to the manufacture of friction bodies for brake and clutch purposes, and more particularly to the manufacture of friction rings for laminated disc clutches. A method of manufacturing such friction rings by pressing a frictional material, consisting of a fibrous structure saturated with a binding medium that subsequently hardens, in a still plastic condition, into interruptions in an annular disc of sheet steel is already known. My present invention relates to means for pressing the frictional material into and on said laminations simultaneously from both sides with the requisite accuracy and reliability on mass production lines.

My invention is illustrated by way of example in one constructional form in the accompanying drawings wherein, Fig. 1 is a perspective view of the pressing apparatus as a whole with a portion of the plunger of a press, Fig. 2 shows, likewise in perspective the individual parts of the apparatus separated from one another, Figs. 3a and 3b show the pressing apparatus more diagrammatically in sectional elevations through the centre at two different stages in the work.

The drawings are based upon a constructional form which is intended for pressing frictional material in the form of round disc bodies into the annular friction discs of laminated disc clutches. Of the apparatus, substantially only the actual press mould, with the swages and the working mechanism directly connected therewith, is shown. The press itself, which may be an ordinary eccentric press, is omitted, since it is unnecessary for the explanation of the invention.

The press mould consists essentially of six parts, a lower ram carrier $a$ resting upon the table of the press, a lower swage member $b$, an upper swage member $c$, a member $d$ locking together these two parts to form a single body hereinafter designated an outer swage, and a lever mechanism $f$ guiding the outer swage.

In the centre of the base plate is arranged the lower ram 2 rigidly connected therewith. Round the lower ram are grouped four springs 3, which support the outer swage $b, c$.

The lower member $b$ of the outer swage forms a massive annular body, which is supported on the under side at 4. To the upper side are secured two segmental pieces 7 and 8, by which a recess 5 is formed, which passes transversely across the swage, and in its outline corresponds exactly to that of a corresponding segmental part of the ring of sheet material to be provided with the frictional covering. One piece of such a ring of sheet material is shown in Fig. 1, and denoted by 20. In the centre the swage member $b$ has a hole 6 passing through it.

The upper member $c$ of the outer swage consists of a massive disc, which is provided at opposite points with radial projecting handles 9, 9, and with peripheral notches 10, 10 in staggered relationship thereto. Furthermore, upon the upper side of the disc, at two opposite points are provided wedge-shaped cams 11, 11. The disc $c$ is likewise bored through at the centre. The bore $6^a$ in question corresponds in diameter to the bore 6 in the lower member $b$.

The members $b$ and $c$ of the centre swage admit of being connected rigidly with one another by the locking member $d$, shown in Fig. 2. The locking member consists of an annular body 12, which is provided laterally with two handles 13, 13 and which engages by means of an inwardly directed projection with the stop 4 on the lower member $b$ of the central swage, and of two upwardly directed arms 14, the upper ends of which are bent inwards to form hooks. The arms 14 engage in the notches 10 in the upper member $c$, while the hooks 15 of the arms 14, upon the locking member being rotated relatively to the upper member $c$, run up on to the oblique cams 11, and thereby clamp the two parts of the swage firmly together.

The lower member $b$ of the outer swage is provided laterally with two pegs 16 opposite to one another, in which there engage arms 17 of a single-armed lever system denoted as a whole by $f$, which is firmly supported at 18 and the free end of which is pivotally connected at $p$ by a pull rod 19 with the reciprocating plunger P of a press of usual construction. The dimensions of the lever device are so selected that the path traversed by the swage guided by the lever arms during the working of the press is half as great as the path of the head ram *e*, the peg 21 of which fits into the bore 6ᵃ in the upper member *c* of the swage.

The method of working of the apparatus is as follows:—After the upper member *c* of the swage has been unlocked and removed, the plastic frictional material is introduced into the lower swage member (see Fig. 3*a*), which is held by the springs 3 in a raised position limited by fixed steps, the said frictional material consisting for example of a somewhat dried mixture of asbestos fibres with an alcoholic solution of bakelite. After the cavity 6 in the swage member *b*, which is closed at the bottom by the ram 2, is quite filled up with the material, the sheet steel ring 20 is fitted into the recess 5. The projections in the sheet metal ring that fit into the corresponding toothed wheel-like recesses provide for the discontinuity in the sheet metal ring, which is to be provided with the friction body, to register with the bore 6. The interruptions in the sheet metal ring, as indicated by Figs. 3*a* and 3*b*, are somewhat smaller than the pressure spaces 6 and 6*a* of the swage. After putting in the sheet metal ring 20, the upper swage member *c* is put on and locked to the lower member. The pressure space 6*a* in the upper swage member is then likewise filled with the frictional material, up to a level which may be indicated by a mark and which corresponds to the depth of the lower filling. The press is now started. The peg 21 of the head ram *e* descends into the bore 6ᵃ and compresses the material located therein. At the same time the outer swage *b*, *c* is moved downwards by the aid of the lever mechanism *f*, this movement taking place at half the velocity of the head ram. Consequently a completely uniform compression of the materials takes place, both above and below the sheet metal lamination 20, without the latter being itself subjected to any compressive stress in either direction. This is important, amongst other things, because the compression pressure is very heavy, so that in the event of the stress being one sided, a distortion of the sheet metal lamination towards the other side would be the inevitable result. The frictional material, as Fig. 3*b* indicates, is very considerably compressed, in practice to about one-eighth or one-tenth of its original volume. At the same time it receives its final form, so that no subsequent treatment is necessary. During the return of the head ram *e*, the swage is pressed upwards again by the springs 3. Then after the locking of the two swage members *b* and *c* is released, the upper part *c* can be removed and the sheet metal ring 20 displaced by one division, for the purpose of filling up the next interruption with frictional material.

The invention is of course not limited to the pressing of frictional material into the interruptions in clutch laminations of the kind illustrated in the drawings, but may be employed wherever it is a question of providing friction discs or the like with frictional coverings on both sides. The covering pieces need not even be of the round shape assumed in the present case but may be in the shape of segments bounded by radial or other straight lines. It is also possible for the covering pieces to be arranged in direct connection with one another in the peripheral direction. Finally, the pressing apparatus, while adhering to the principle of the invention, would admit of being differently constructed in such a way that friction rings of the kind mentioned are provided upon their entire periphery from both sides with unitary coherent coverings.

I claim:

1. In an apparatus of the character described, a swage consisting of two parts provided with molding cavities therein and constructed to secure between the parts a portion of an annular sheet metal disk having a hole therein substantially between said cavities; a stationary pressure member in one of said cavities; a movable pressure member in the other cavity movable relative to the swage and the stationary member; and means supporting said swage for movement in the same direction without being directly engaged by the latter.

2. In an apparatus of the character described, a swage consisting of two parts provided with molding cavities therein and constructed to receive between the parts a portion of an annular sheet metal disk having a hole therein between said cavities; means for clamping said swage parts together with said portion therebetween; a stationary pressing member in one of said cavities, said swage being mounted for sliding on said stationary member; a ram in the other cavity; and means operable for moving said swage with the ram in the same direction and at less than the speed of the ram during the whole stroke of the latter.

3. In an apparatus of the character described, a swage consisting of two parts provided with alined molding cavities therethrough and constructed to securely receive between the parts a segmental portion of an foraminous annular sheet metal disk with one of its holes between said cavities; means for clamping said swage parts together with said segmental portion therebetween; a stationary pressing member in one of said cavities; a ram in the other cavity; resilient means for supporting the swage; and a lever mechanism adapted to move said swage with the ram in the same direction and at less than the speed of the ram during the whole stroke of the latter.

4. In an apparatus of the character described, a swage consisting of two parts provided with molding cavities therein and adapted to hold between the parts a part of a metal sheet disc having a hole therein substantially between said cavities; a stationary pressing member in one of said cavities; a ram in the other cavity movable toward and from the stationary member; and means supporting said swage and permitting it to move simultaneously with said ram in the same direction but at less speed than the ram, without being directly engaged by the latter.

In testimony whereof I affix my signature.

HANS KATTWINKEL.